Figure 1:
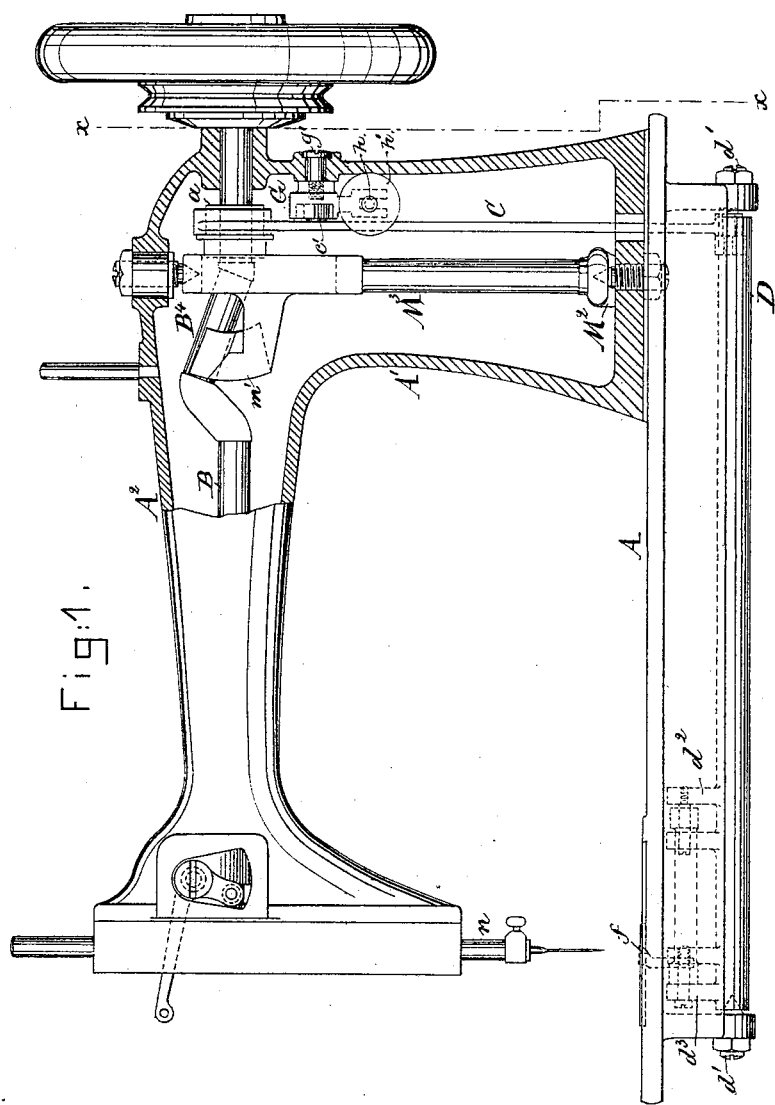

(No Model.) 2 Sheets—Sheet 1.

P. DIEHL.
FEEDING MECHANISM FOR SEWING MACHINES.

No. 388,345. Patented Aug. 21, 1888.

WITNESSES:

INVENTOR.
Philip Diehl,
BY Crosby & Gregory.
ATTORNEY.

(No Model.) 2 Sheets—Sheet 2.
P. DIEHL.
FEEDING MECHANISM FOR SEWING MACHINES.
No. 388,345. Patented Aug. 21, 1888.
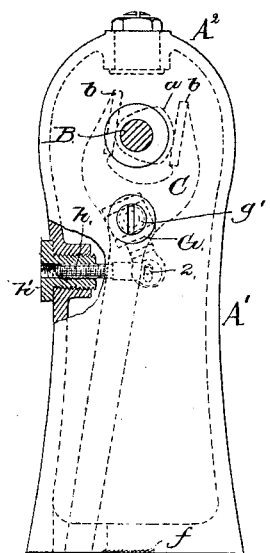
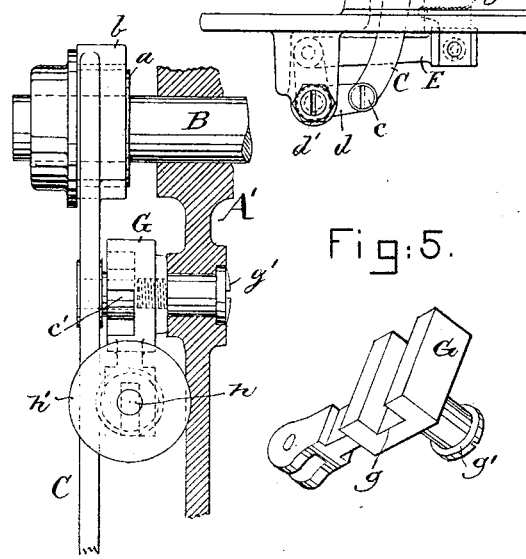
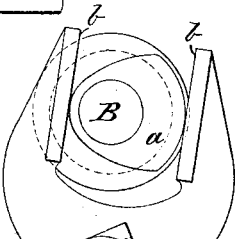
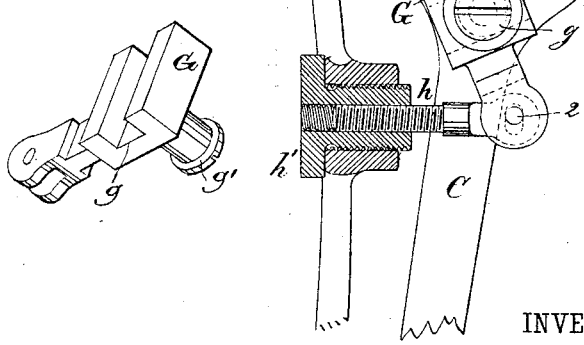
WITNESSES:
INVENTOR.
Philip Diehl.
BY Crosby & Gregory
ATTORNEY.

UNITED STATES PATENT OFFICE.

PHILIP DIEHL, OF ELIZABETH, NEW JERSEY, ASSIGNOR TO THE SINGER MANUFACTURING COMPANY OF NEW JERSEY.

FEEDING MECHANISM FOR SEWING-MACHINES.

SPECIFICATION forming part of Letters Patent No. 388,345, dated August 21, 1888.

Application filed July 1, 1886. Serial No. 206,810. (No model.)

*To all whom it may concern:*

Be it known that I, PHILIP DIEHL, of Elizabeth, county of Union, and State of New Jersey, have invented an Improvement in Feeding Mechanism for Sewing-Machines, of which the following description, in connection with the accompanying drawings, is a specification, like letters on the drawings representing like parts.

This invention has for its object to simplify and improve the feeding mechanism of sewing-machines, the invention being especially adapted for use in that class of sewing-machines having a rotary shaft in the overhanging arm.

Herein a cam on the main shaft in the overhanging arm is embraced by the bifurcated end of a link jointed at its lower end directly to an arm of a rock-shaft parallel to the main shaft but located below the cloth-plate, the said rock-shaft having other arms to which are jointed the rear end of the feed-bar, the said feed-bar, its forward end being supported in any usual manner so as to be raised and lowered at the proper times, being reciprocated by the said rock-shaft. The bifurcated link has at one side a stud provided, preferably, with a roller that enters a slot or groove in a guideway in or forming part of a regulating-lever, the cam, secured to the main shaft and rotating between the forks of the link, causing the stud to travel in or with relation to the slot or groove of the said regulating-lever, the position of the latter causing the reciprocation of the link for a greater or less distance to vary the length of the feed-stroke.

This invention in feeding mechanism for sewing-machines consists, essentially, in the combination, substantially as will be described, of a rotating shaft in the overhanging arm of the machine, a cam or eccentric thereon, a bifurcated link embracing the said cam or eccentric and provided with a stud, a rock-shaft having an arm to which the said link is attached, a feed-bar connected to an arm of the said rock-shaft, a slotted or grooved regulating-lever to receive the stud of the said link, and means to adjust the said lever to alter the throw of the link, rock-shaft, and feed to vary the length of stitch.

Figure 1 is a side elevation, partially broken out, of a sewing-machine embodying my invention; Fig. 2, a section of Fig. 1 in the dotted line *x x*, looking toward the left, the dotted lines showing the link, cam, and regulating-lever inside the upright arm, the screw-nut for moving the regulating-lever being in section; and Figs. 3, 4, and 5, details to be referred to.

The bed or cloth-plate A, the upright A', and overhanging arm A² are and may be of any usual or suitable construction. The overhanging arm contains bearings for the main rotating shaft B, provided with a cam, or it might be an eccentric, $a$, which is embraced by the flattened faces $b$ of a bifurcated lever, C, connected at its lower end by a pin or screw, $c$, directly to the arm $d$ of a rock-shaft, D, supported at each end, as herein shown, by point-screws $d'$, the said rock-shaft, near its opposite ends, having other arms, $d^2 d^3$, (shown by dotted lines, Fig. 1,) to which is pivoted or jointed the bar E, having attached to or forming part of it the toothed surface $f$, the said bar and surface constituting the feeding device to engage the material being stitched and move it after each stitch. The link C, at one side just below its forked end, is provided with a roller or other stud, $c'$, which enters the slot or open groove $g$ of the regulating-lever G, made as a block, which has for its fulcrum the screw or other stud, $g'$, mounted in the upright A', one arm of the lever being jointed, as at 2, to a screw-rod, $h$, surrounded and engaged by a threaded nut, $h'$, preferably milled at its large or outer end and screw-threaded externally but reversely from the threads on the screw $h$, the external threads of the nut, of a different pitch and preferably coarser than the threads of the screw $h$, engaging a screw-threaded opening in the arm A', so that for each rotation of the nut or bushing $h'$ the screw-rod $h$ will be moved longitudinally for a distance equal to the difference between the pitch of the threads of the nut and the screw-rod, such construction providing for very fine adjustment of the lever G. As the lever C is moved by the cam $a$, the stud $c'$ is caused to move in the slot or groove of the regulating-lever, and the lever C is moved a greater or less distance longitudinally, and the rock-shaft is turned more or less, and consequently the feed-bar E is given a longer or shorter stroke according to the position of the slot or groove of the regulating-lever G, in which the said stud moves, the greater the angle of the slot or groove of the said lever from a horizontal line the greater the longitudinal movement of the said link C, and vice versa. Rotation of the nut $h'$ to the left will cause it to move outwardly in the upright A', and the interior threads of the nut engaging the left-hand threads of the screw-rod $h$ will also cause the rod to move outwardly with it.

The shaft B has a diagonal crank, $B^4$, which is embraced by wings $m'$ of a vertical rod or rocker, $M^3$, provided at its lower end with an arm, $M^2$, which in practice will form part of the shuttle-actuating mechanism. The shaft B at its front end will be operatively connected with the needle-bar to reciprocate it in usual manner. The shaft B and rocker $M^3$ are the same as in United States Patent No. 326,821, dated September 25, 1885, and in practice the feed-bar herein described may be raised and lowered in manner described in the said patent.

The mechanism herein described is simple, direct, and positive, and the link, forked at one end to embrace the main rotating or needle-bar actuating shaft, is at its lower end jointed directly to an arm of a rocking-shaft, which has another arm to which is jointed the feed-bar or device to be reciprocated.

I claim—

1. The rotating needle-bar-actuating shaft located in the overhanging arm of the machine, a cam or eccentric thereon, the rocking shaft located below the cloth-plate, the feeding bar or device jointed to an arm of the said rocking shaft, and the link C, bifurcated or forked at its upper end to embrace the said cam or eccentric, the said link having a stud at one side and jointed at its lower end to an arm secured directly to the said rocking shaft, combined with the independent pivoted feed-regulating lever G, having a slotted or grooved way therein to co-operate with the said stud, and a device to move the said lever, the said rotating shaft moving the upper end of the link about its pivot or fulcrum, the pin $c'$, and causing the said link to be moved longitudinally a greater or less distance according to the position of the slot or groove of the regulating-lever, substantially as described.

2. The rotating needle-bar-actuating independent shaft, its cam or eccentric, the feeding-bar, the rocking shaft D, having arms to which it is jointed, and the link C, forked at its upper end to embrace the said cam or eccentric and jointed at its lower end directly to an arm of the said rocking shaft and having at one side a roller-stud, combined with the independent pivoted feed-regulating lever grooved or slotted at one side to receive the stud of the lever C, the screw-rod attached to the regulating-lever, and the internally and externally threaded nut $h'$, by which to adjust the said lever, substantially as described.

In testimony whereof I have signed my name to this specification in the presence of two subscribing witnesses.

PHILIP DIEHL.

Witnesses:
JAMES G. GREENE,
MARK DUNNELL.